United States Patent [19]

Maier et al.

[11] Patent Number: 5,408,587
[45] Date of Patent: Apr. 18, 1995

[54] EXPERT SYSTEM WITH A FRAME EXPLANATION SYSTEM

[75] Inventors: Franziska Maier, Freiburg; Claudia Mueller, Oberwolfach; Serge Saelens, Ehningen, all of Germany

[73] Assignee: International Business Machines Corporation, Armonk, N.Y.

[21] Appl. No.: 916,923

[22] Filed: Jul. 20, 1992

[30] Foreign Application Priority Data

Aug. 28, 1991 [DE] Germany .................. 911 14 533.2

[51] Int. Cl.⁶ .................................... G06F 9/44
[52] U.S. Cl. ............................. 395/51; 395/10; 395/54
[58] Field of Search .................... 395/51, 54, 10

[56] References Cited

U.S. PATENT DOCUMENTS 4,763,277  8/1988  Ashford et al. ................ 395/51
4,809,219  2/1989  Ashford et al. ................ 395/51

OTHER PUBLICATIONS

Explanation Generation in Expert Systems Sanders et al. IEEE May 1990.
A Graphic Explanation Environment for Expert Systems Koussev et al. IEEE 18–20 Sep. 1989.
Design for Explainable Expert Systems Swartout et al. IEEE Jun. 1991.
Knowledge Representations and Interfaces in Financial Expert Systems Lambert et al. IEEE 19–22 Mar. 1990.
Designing Knowledge-Based Systems Within Functional Architecture David et al. IEEE 6–10 Mar. 1989.
"A Study of the Knowledge Required for Explanation in Expert Systems", Millet, et al., IEEE Mar. 6, 1992.
"Explaining Concepts in Expert Systems", Rubinoff, IEEE Dec. 11, 1985.
"Explanation in Intelligent Systems", Ellis Horwood, Ltd., 1989.
"Explanation Structures in XSEL", ACLACL, Aug. 8, 1987.
"BLAH, A System Which Explains Its Reasoning", Weiner, 1980.

*Primary Examiner*—Allen R. MacDonald
*Assistant Examiner*—Richemond Dorvil
*Attorney, Agent, or Firm*—Joseph C. Redmond, Jr.; Ronald L. Drumheller

[57] ABSTRACT

An explanation system for use in an expert system is described. The rule base used in the inference engine of the expert system is divided into groups of rules called rule classes. With each rule class, three types of explanations are associated: strategy explanations, reason explanations and inference explanations. The rule classes are arranged in a hierarchical explanation tree structure. Each time a first rule is fired within a rule class, a frame is created into which the explanations relating to that rule class are copied. After the completion of the reasoning process, the frames can be used to generate an explanation of the reasoning process.

8 Claims, 3 Drawing Sheets

EXPERT SYSTEM WITH A FRAME EXPLANATION SYSTEM

BACKGROUND OF THE INVENTION

1. Field of the Invention

The invention concerns an expert system with an inference engine, a rule base containing rules for the operation of the expert system and an explanation system for producing an explanation of the operation of the expert system.

2. Background

Expert systems, or knowledge-based systems, are being increasingly used to help in a variety of fields, such as the diagnosis of illness or identification of faults in a machine. They use whatever facts are available to either produce a result or confirm a suspected result. In carrying out the reasoning a number of pre-programmed rules, called a rule base, are used which are developed from the knowledge of experts in the field in which the expert system operates. These rules are processed by what is usually termed an 'inference engine'.

A number of different tools are known for allowing the development of an expert system. The PROLOG Language and IBM KnowledgeTool (trademarks of IBM Corp.) are two well-known tools. U.S. Pat. No. 4,803,641 (Hardy et al) also describes a tool for developing an expert system.

Two types of mechanism are most usually employed in the inference engine in order to carry out the reasoning process. An inference engine with a forward chaining procedure starts with an initial set of facts and develops from this initial set as many further facts as possible. An inference engine with a backward chaining procedure on the other hand is goal-oriented. It starts with a premise (goal) which must be given at the beginning of the procedure and then tries to see whether the given facts confirm this goal. In European Patent Application EP91105698.4, an inference engine is described in which the forward-chaining and backward-chaining methods are integrated.

In addition to knowing the result of the analysis, the user is often interested in knowing how and why the inference engine came to the result that it did. This requires the presence of an explanation system to produce an explanation of the reasoning that was carried out. The user may also be interested in hypothetical possibilities, such as what would happen if certain other facts were given, or he may be interested in knowing why the inference engine did not come to a certain conclusion. Such questions might also be answered in an explanation system. A survey of explanation systems and possible approaches is given in the article "Explanation in Intelligent Systems" by C. Ellis which was published in "Expert Knowledge and Explanation: the knowledge-language interface" edited by C. Ellis, Ellis Horwood, Chichester, 1989.

In the simplest expert systems, explanation systems merely involved a listing of all the rules that were 'fired' (i.e., used) during the analysis. An example of such a system is the MYCIN system which was developed to assist a physician who was not an expert in antibiotics with the diagnosis and treatment of bacterial blood infections. The MYCIN system is described in the book "Rule-based expert systems: the MYCIN Experiments of the Stanford Programming Project", edited by B. G. Buchanan and E. H. Shortliffe, Addison-Wesley, Reading, Mass., 1984.

However, as expert systems become increasingly complicated, such a procedure is inefficient since many hundreds of rules may be fired during the course of the reasoning process. In addition, the comprehensibility of the explanation for the average user decreases as he has to search among the large number of rules displayed in order to find the explanation that he is searching for. Finally, since complete explanations are stored for every rule fired, the performance of the system is diminished since a number of duplicate explanations may be stored.

A further problem encountered when using explanation systems in an expert system was identified by C. Millet and M. Gilloux in their article "A Study of the Knowledge Required for Explanation in Expert Systems" published in the "Proceedings of the Fifth Conference on Artificial Intelligence Applications (CAIA)", Mar. 6–10, 1989, Miami, Fla., pps. 83–90 and published by the IEEE Computer Society Press. They realized that in existing implementations of expert systems part of the knowledge that should be transferred was not communicated. They identified two types of uncommunicated knowledge: 'missing knowledge' and 'implicit knowledge'. Missing knowledge is that knowledge which was used by the expert in designing the rules for the expert system which is, however, not required during the search for a solution. Implicit knowledge is the knowledge of which the expert may not be aware that he possesses but nonetheless he 'implicitly' assumes when he is designing the rules for the expert system. An example of such implicit knowledge is the way in which the rule is expressed. While the wording may be clear for the expert, the average user of the system may fail to appreciate the significance of expressing the rule in one way rather than in another way. Their solution to this problem was to build another knowledge base on top of the existing rule base which did not change the reasoning approach of the system but was only limited to explanatory purposes. The inclusion of this extra knowledge base reduces the performance of the system substantially since, in addition to carrying out the reasoning process, the expert system has to fetch from the extra knowledge base the required explanations.

R. Rubinoff in his article "Explaining Concepts in Expert Systems: the CLEAR System" published in "Artificial Intelligence Applications: The Engineering of Knowledge-based Systems: Proceedings of the Second Conference, Miami Beach, Fla., Dec. 11–13, 1985", pps. 416–421, edited by C. R. Weisbin and published by the IEEE CS Press/North Holland, 1985, identified a further need that users of expert systems required when they were confused about what the system was asking. He suggested 'generalized' rules be added to the rule base. These rules themselves could be further generalized, thus, creating a hierarchy of rules. Whenever several rules for explaining a concept that the user will not understand are selected and these rules are all grouped together in a generalized rule, then the generalized rule will be displayed instead of the several individual rules. This type of explanation system, however, requires the developer to develop increasingly abstract rules which may or may not be helpful to the understanding of the reasoning process.

Further types of explanation systems are known. They, however, often require special adaptations of the rule base to incorporate the explanation system. This adaptation alters the structure of the rule base and as a result, can not be easily incorporated into existing rule bases.

SUMMARY OF THE INVENTION

The object of the invention is to build an explanation system for incorporation into an expert system which overcomes the above problems.

A further object of this invention is to build an explanation system which can be incorporated into an existing expert system without requiring changes in the structure of the rule base.

These objects, and other advantages as will become apparent, are achieved by grouping the rules in the rule base of the expert system into rule classes. To each rule class, a number of types of explanations are added, such as strategy explanations or reason explanations. In addition, further explanations can be added as the rules are fired.

The explanations are collected together in a series of frames and, after the reasoning process has been completed, the user can interrogate the frames in order to understand the reasoning process.

The user can use a number of methods in order to interrogate the frames in order to obtain explanations about the reasoning process. For example, windowing techniques can be used to allow the user to run through the explanations on a graphics screen using a mouse. Alternatively, a command language could be developed to allow the user to control the manner in which explanations are given.

The explanation system as described finds applications in all fields in which expert systems are implemented. It can be used in medical systems to allow paramedics to safely diagnose and treat emergencies or in allowing a computer repairman to understand the output of a computer dump to analyze a failure in a computer system.

BRIEF DESCRIPTION OF THE DRAWING

The foregoing, and other advantages of the invention will be more fully understood with reference to the description of the preferred embodiment and with reference to the drawing wherein.

DESCRIPTION OF THE PREFERRED EMBODIMENT

Figure 1:
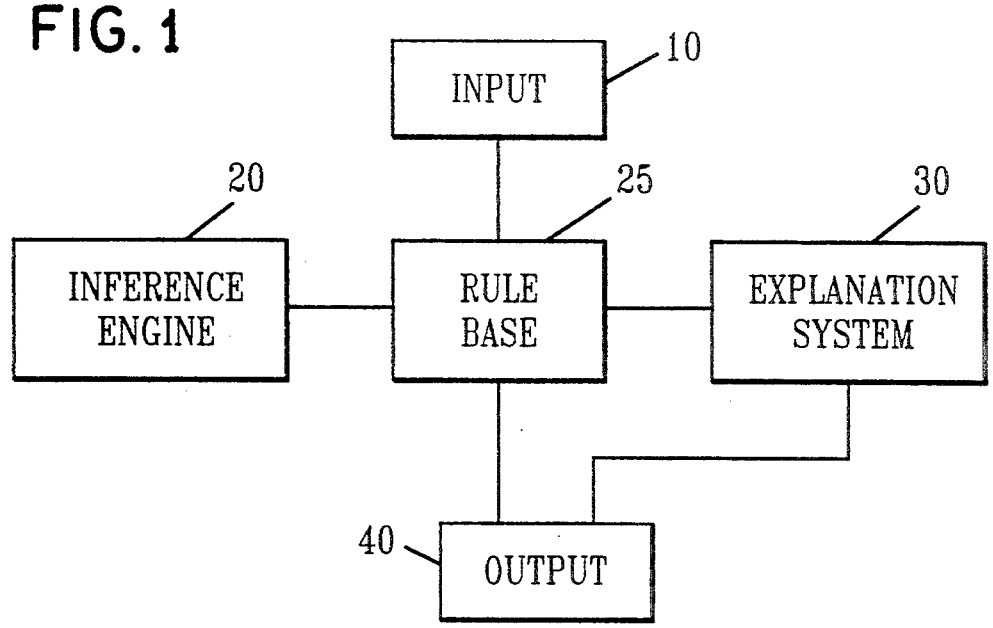
FIG. 1 shows the structure of the invention.

The structure of the apparatus used in this invention is depicted in FIG. 1. It comprises an input 10 in which the known facts are input, an inference engine 20 in which the facts are analyzed and inferences drawn from the facts, a rule base 25 containing rules used to analyze the facts and an explanation system 30 which provides explanations about the reasoning process. The inference engine 20 can use any type of inference mechanism; in the preferred embodiment a forward-chaining mechanism is used. The rule base 25 and the explanation system 30 are both connected to an output 40. The output 40 can be any type of output device capable of displaying text such as a printer or a display screen.

Figure 2:
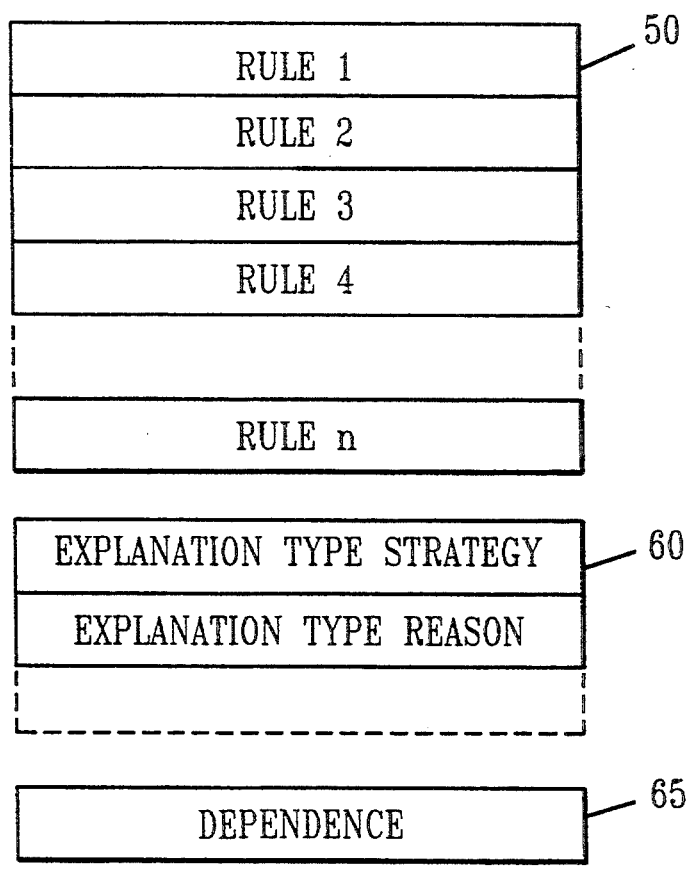
FIG. 2 shows the structure of a rule class.

The rules forming the rule base 25 and processed by the inference engine 20 are grouped together in groups which are called rule classes. The data structure of one such rule class is shown in FIG. 2. Each rule class comprises a series of rules which all contribute to the same goal in the reasoning process. These rules are stored in a rule table 50. For example, in an expert system for diagnosing illness, one rule class may contain rules which test whether the illness is caused by a bacteria, while another rule class may contain rules to determine whether a virus is involved. The rules may be of the form IF . . . . THEN or any other form. The rules do not need to be grouped together in the rule base 25. All that is necessary is that each rule be assigned a rule class to which it belongs.

With each rule class, explanations can be associated. In the example shown in FIG. 2, three types of explanations are provided. Two of these types of explanations are given in an explanation table 60.

Strategy explanations are the general principles according to which the reasoning steps are carried out. For each rule class, the strategy explanations will indicate the function of the rule class, i.e., what is happening. An example of a strategy explanation is "diagnose illness", or "analyze problem".

Reason explanations give the background knowledge which forms the basis for the reasoning process. They give explanations about why something happens. An example of a reason explanation is "Block A contains important information about the problem, therefore it makes sense to look there for background information". Inference explanations on the other hand are not taken from the explanation table 60 but are derived from the rule base itself as outlined below. This type of explanation may vary during every reasoning process as they comprise concrete statements which are derived during the reasoning process from the input facts. Inference explanations inform the user about how the function of the rule class had been fulfilled and what results have been achieved. An example of an inference explanation is: "As the patient has a temperature, runny nose and a headache, it is concluded that the patient has influenza".

Figure 3:
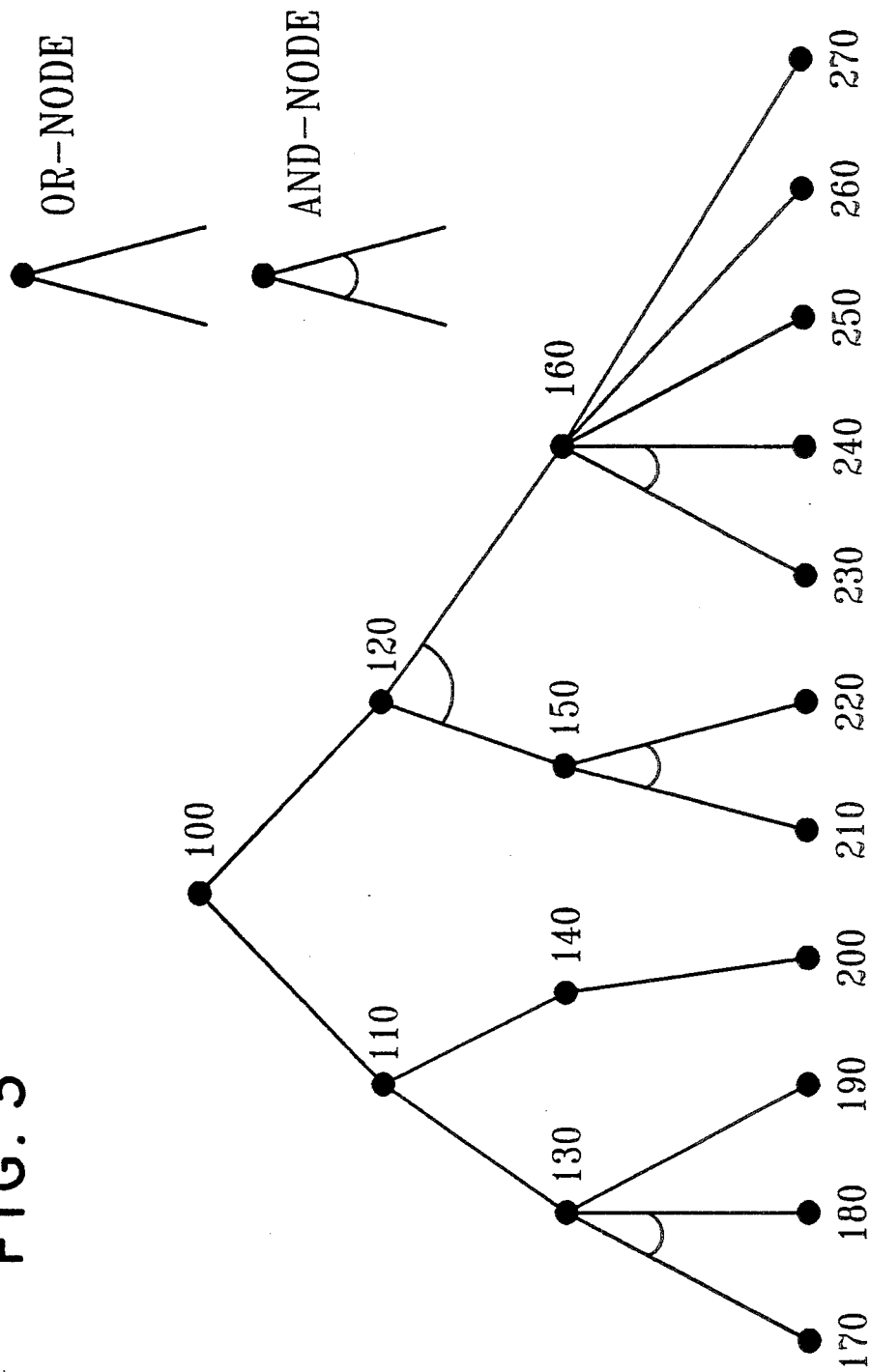
FIG. 3 shows the structure of an explanation tree.

The rule classes can be related together in a tree structure as shown in FIG. 3. Each of the rule classes form a node 100–270 of the tree. The nodes 100–270 of the tree can be connected together either through AND operations or through OR operations. The position of the rule class in the tree and its relationship to other rule classes in the same level of the tree is indicated in the dependence table 65 shown in FIG. 2.

This dependence table 65 shows which rule classes in a lower level of the tree are dependent on rule classes in the next higher level of the tree and also indicates which rule classes in a lower level of the tree are dependent on other rule classes in the same lower level. This means that if any of the rules in for example, rule classes at nodes 130 and 140, are fired, then their generated explanations have to be read in conjunction with the explanations generated by firing the rule class at node 110. For reasons of clarity, a simple tree structure is shown in FIG. 3. However, it is conceivable to develop more complicated structures in which nodes in lower levels of the trees are not dependent on only one node in a higher level, but on several nodes. For example, node 130 in FIG. 3 is shown to be only dependent on node 110. However, it might also be made to be dependent on node 120. This relationship would also be indicated in the dependence table 65, thus forming an explanation net.

AND operations (such as those shown on FIG. 3 at nodes 120, 130, 150 and 160) connect nodes in the same tree level which depend on each other. An example of such a dependence would be the relationship where a first node searches for a problem and the second node names the problem. Clearly reading the explanations generated by the second node is only necessary if interrogation of the rule class in the first node has shown that a problem exists. The order in which the rule classes are to be tested is also given in the dependence table 65 of the nodes.

OR operations connect nodes which do not depend on each other (such as those shown on FIG. 3 at nodes 100, 110, 130, 140 and 160). For example, a first node might be "buy bread", a second node might be "buy sausage" and a third node might be "buy milk". Each of these operations is independent of each other, they can be carried out separately from each other and the generated explanations read separately from each other. The act of carrying out one operation does not affect the outcome of the other operations.

It can be seen at nodes 130 and 160 in the tree that some of the rule classes dependent on these nodes are connected by AND operations (nodes 170, 180, 230, 240) while others dependent on the same node are connected by OR operations (nodes 190; 250, 260, 270).

The root 100 of the explanation tree gives the most abstract explanations while the leaves 110–270 of the tree give the most detailed explanations. That is to say, the farther that one travels up the tree, the more detailed the explanations become. These detailed explanations allow the user of the system to obtain the required information about any small bit of the system that he or she requires.

Using the tree, the complete reasoning strategy followed by the expert system in coming to a conclusion from the input facts can be understood. This is possible since every time a rule is fired in one of the rule classes a strategy explanation will be produced explaining what the rule class is testing for. Thus, by analyzing all of the strategy explanations, the user can determine the procedure which the expert system used in coming to its conclusions.

The operation of the expert system will now be described. Before the expert system with the explanation system can be operated, one or more experts have to construct the rule base which is to be used. In addition to defining the rules, the experts have to classify the rules into rule classes. As mentioned above, these rule classes group the rules together which fulfill the same task in the reasoning process.

With each rule class, the experts have to supply explanations associated with the rule class. In the preferred embodiment, these explanations comprise strategy explanations or reason explanations. However, it is possible that other types of explanations can be provided. These explanations should be of sufficient length and clarity to allow the user to understand the reasoning of the system. It is, of course, conceivable that the background knowledge of the users using the expert system will vary. Therefore, it would be possible to grade the extent of the explanation. For example, a novice user would require a much more detailed degree of explanation than a more experienced user. The different grade of explanations would be stored in the table 60 shown in FIG. 2 and the user of the expert system would then select which grade of explanation she or he requires. In addition a hypertext system could be installed to further explain unfamiliar terms.

As the expert system is used and as more knowledge about the problem is acquired, it is possible to upgrade the rule base of the expert system. This is simply done by the expert who upgrades the system selecting the rule class into which the new rule is to be placed and then adding a new rule to this class. For example, in the example shown in FIG. 2, the expert would add a new rule n+1 to the rule base 50. The expert is not required to alter the strategy, reason or other explanations associated with each rule class.

Further rule classes can be additionally created without difficulty. This process would be carried out by the expert defining the new rules or reclassifying existing rules that are required and putting these into a new rule table 50, writing explanations about the function of the rule class and adding these to the explanation table 60 and finally defining the dependence of the rule class and storing this in the dependence table 65.

Figure 4:
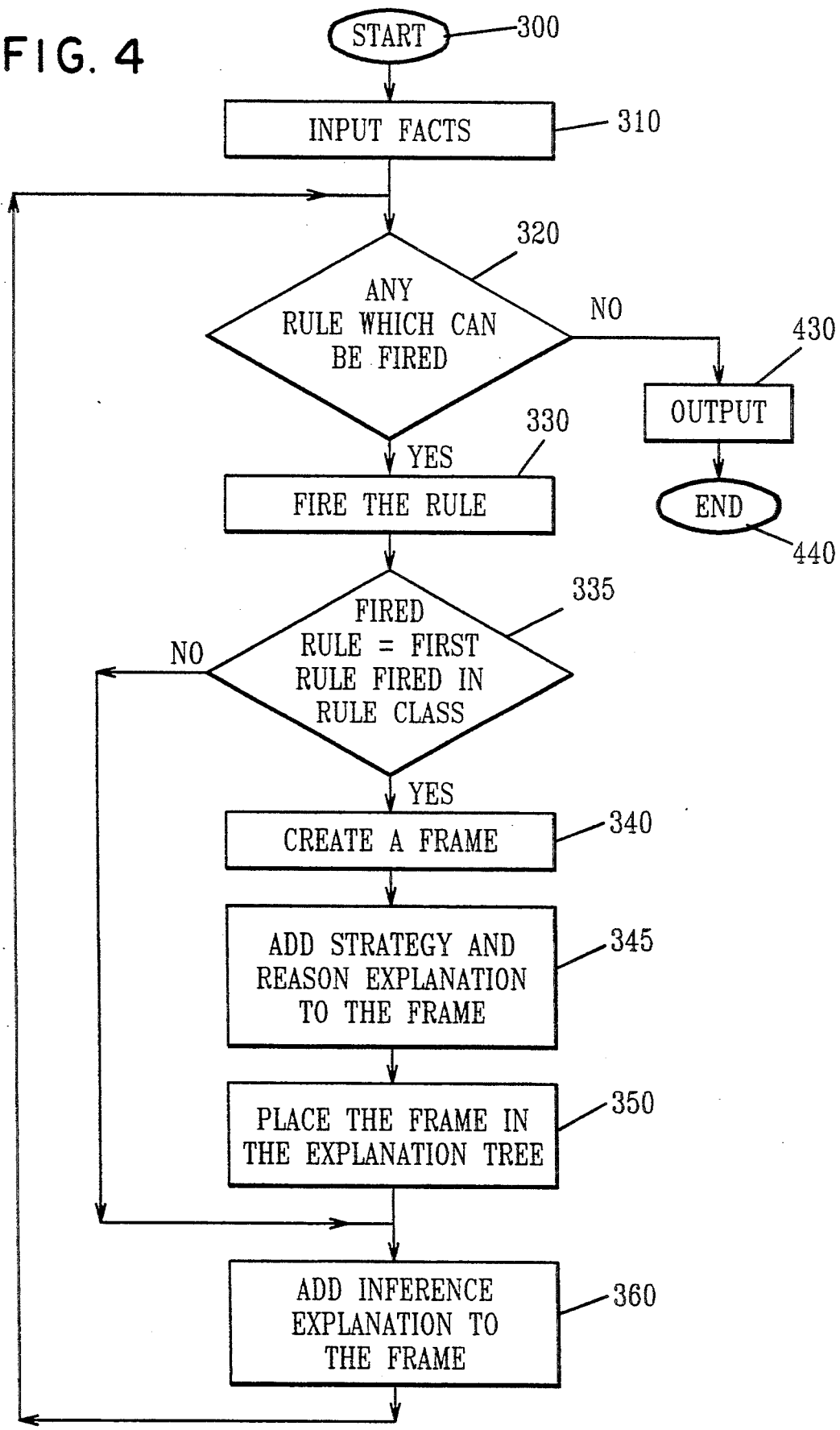
FIG. 4 shows a flow diagram for the generation of explanation frames during process.

After the expert has defined the rules and added the explanations, the expert system is ready for use by the user. In FIG. 4, a flow diagram is presented showing the various operations that are carried out. In step 310 of the table the user inputs the facts that he knows and from which he wishes conclusions to be drawn. The expert system then searches the rule base 25 (step 320) to see whether any of these facts fire any of the rules in the rule base 25. This rule will then be fired (step 330). The fired rule does not necessarily need to be in the rule class forming the root of the tree, since the tree does not determine the order of rule firing. The tree is used for generating the explanations.

Should the first rule in any rule class be fired (step 335), then at step 340 a frame is created into which is placed the strategy explanation and the reason explanation for the rule class in which the fired rule is present (step 345). Using the information stored in the dependence table 65, the created frame can be placed automatically at the correct node in an explanation tree (step 350). In step 360 the inference explanation is also added to the frame, this type of explanation being directly derived from the rule fired.

If, however, in step 335, it was determined that the fired rule was not the first rule in the rule class to have been fired, then no new frame needs to be created. Thus, the process jumps automatically to step 360 and a new inference explanation is added to the frame. Since the strategy explanation and reason explanation for the rule class have already been included in the frame, it is no longer necessary to add them.

After the inference explanation has been added (step 360), the reasoning process returns to step 320 to see whether any more rules remain in the rule base to be fired. If this is the case then the reasoning process continues through the loop. If, however, no more rules remain in the rule base 25 to be fired, then an output is prepared in step 430.

The output in step 430 is constructed from the frames that have been created during the reasoning process and the explanation tree in which the frame has been placed. Each frame contains a strategy explanation, a reason explanation and a number of inference explanations depending on the rules fired in each rule class.

The level and quality of the output depends on which frames were created during the reasoning process and placed in the explanation tree. For example, should rules have been fired which are in the leaves of the explanation tree, then fairly detailed explanations will be supplied. On the other hand, should only rules in nodes deeper in the tree have been fired, the explanations will be much more general.

Using the frames, the user can then look through the supplied explanations with help of the dependence tables 65 to follow the reasoning strategy used and understand why certain conclusions were reached. A number of different support programs can be envisaged to allow the user to look at the frames. For example, a graphics interface using windows technology would allow the explanation tree to be reconstructed. Alternatively, a command language might be used to allow the user to directly proceed to certain points within the explanation. For a novice user who is not interested in the detailed explanations, an interface could be developed in which the only explanation given was a command such as "give penicillin urgently as suffering from illness" or "replace card No. 2378 as it is not functioning".

The explanation system described herewithin can be applied to any type of expert system in which explanations are required. It can be added to already existing systems developed using languages such as The Integrated Reasoning Shell, PROLOG or the IBM KnowledgeTool system with a minimum of extra programming and overhead. This is possible since the structure of the rule base 25 does not need to be altered. All that needs to be done is that each rule in the rule base 25 be associated with a rule class.

The explanation system will find wide applications in field such as analyzing the memory dump from a computer system to determine why a program failed or in medical systems to allow para-medics to accurately diagnose problems and give quickly help.

While the invention has been described with reference to a preferred embodiment thereof, it will be understood by those skilled in the art that various changes in detail may be made therein without departing from the spirit, scope and teaching of the invention.

We claim:

1. In an expert system with a frame explanation system for inputting and uninterrupted processing of facts comprising:
   means for inputting facts to the system;
   an inference engine comprising means for analyzing the facts and drawing inferences from the facts;
   means for storing a rule base containing rules used to analyze the facts, said rule base being grouped into rule classes, each class containing one or more rules;
   means for storing a dependence table which solely defines the relationship of the rule classes to one another;
   means for firing a first rule in a class when an inference is drawn from the facts;
   an explanation system comprising means for storing explanations associated with each rule class, the explanation system including means for creating a series of frames and storing in a frame one or more explanations when the first rule in a class is fired; and
   means for displaying conclusions generated by the expert system from the inputted facts and related explanations as an output from the expert system.

2. The expert system of claim 1 and further comprising means for modifying the dependence table to change the relationships of the rule classes to one another.

3. The expert system of claim 1 and further comprising means relating the frames to one another in a tree structure of nodes according to the dependence table.

4. The expert system of claim 3 further comprising means for placing an explanation in a frame corresponding to a node when a related rule is fired.

5. The expert system of claim 4 and further comprising means for storing strategy, reason and inference explanations in a frame.

6. In an expert system for inputting and uninterrupted processing of facts, a method of producing explanations comprising the steps of:
   (a) inputting facts for processing in an inference engine;
   (b) searching a rule base grouped into rule classes, each rule class containing one or more rules, the rule classes being related to one another in a dependence table and wherein the rule classes are arranged in a tree structure of nodes;
   (c) firing a rule selected by the inference engine from the facts;
   (d) determining whether the fired rule is a first fired rule in a rule class;
   (e) if the fired rule is a first fired rule in a rule class, creating a frame for the rule class of the first fired rule;
   (f) adding to the created frame one or more explanations related to the rule class of the first fired rule;
   (g) analyzing the facts with the inference engine for any further rule which can be fired and repeating steps (b) through (f) until no more rules remain in the rule base to be fired; and
   (h) outputting conclusions and explanations generated by the expert system from the inputted facts.

7. The method of claim 6 further comprising the step of placing each created frame at a node in the tree structure related to the fired rule.

8. The method of claim 7 further comprising the step of adding an inference explanation to the frame of the rule class of the fired rule.

* * * * *